United States Patent
Beck et al.

(10) Patent No.: US 8,032,755 B2
(45) Date of Patent: Oct. 4, 2011

(54) REQUEST LINKED DIGITAL WATERMARKING

(75) Inventors: Robert L. Beck, Seattle, WA (US); Benjamin K. Fullerton, Redmond, WA (US); Eric W. Scott, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 11/294,219

(22) Filed: Dec. 5, 2005

(65) Prior Publication Data
US 2007/0130467 A1  Jun. 7, 2007

(51) Int. Cl.
*H04L 9/32* (2006.01)
(52) U.S. Cl. ............................................ 713/176
(58) Field of Classification Search .......... 713/176–179; 380/283, 205; 358/3.28
See application file for complete search history.

(56) References Cited

U.S. PATENT DOCUMENTS

| | | | | |
|---|---|---|---|---|
| 6,425,081 | B1 * | 7/2002 | Iwamura | 713/176 |
| 7,434,057 | B2 * | 10/2008 | Yagawa | 713/176 |
| 2005/0193205 | A1 * | 9/2005 | Jacobs et al. | 713/176 |
| 2006/0212705 | A1 * | 9/2006 | Thommana et al. | 713/176 |

* cited by examiner

*Primary Examiner* — Eleni Shiferaw
*Assistant Examiner* — Ali Abyaneh
(74) *Attorney, Agent, or Firm* — Vierra Magen Marcus & DeNiro LLP

(57) ABSTRACT

A method for digitally signing information in real-time, based on a user request for the information. In one embodiment, the method is useful in a Web server, and can be implemented using a server-side API filter. One embodiment of the method includes receiving a data request from a user and determining whether the data requested should be marked. If the data should be marked, the method includes marking the data with a signature identifying at least one component of the user request; and storing information identifying the user with the request and the at least one component. Multiple types of marking techniques can be used on a single data file.

17 Claims, 6 Drawing Sheets

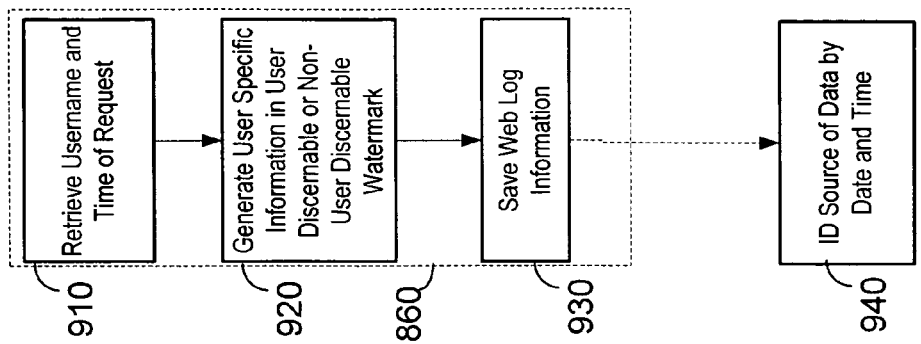
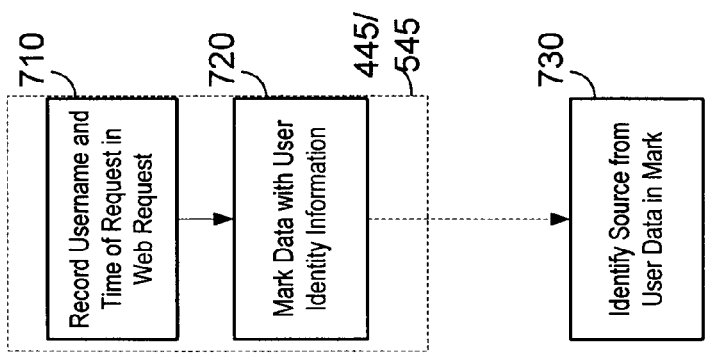
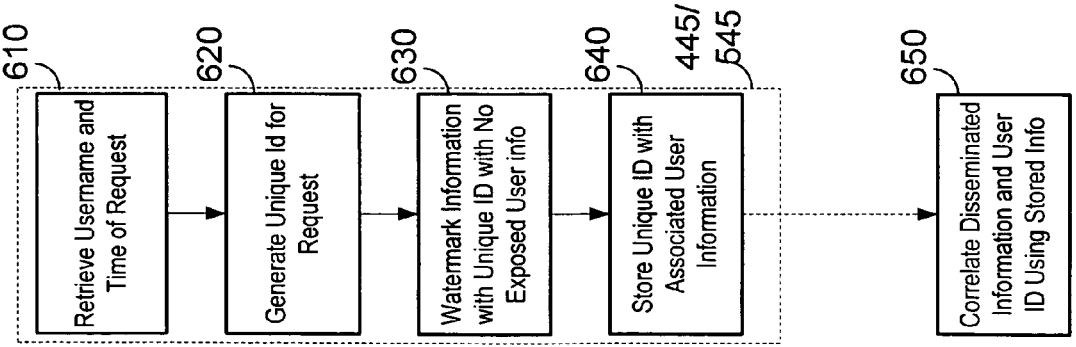

REQUEST LINKED DIGITAL WATERMARKING

BACKGROUND

Currently many businesses have intellectual property (IP) in the form of images, binary files and source code stored on internal, secure servers. This data is available through various mechanisms. One common form of availability is an internal Website which makes such information available for download as either stand-alone content or supporting content for Web-pages. Other mechanisms include FTP servers and file sharing servers. It is generally difficult to track the source of any images which are improperly distributed outside of the business, especially where FTP and Web servers are the source of the information. As a result, the intellectual property rights of the company may be compromised if the information is released outside of the company. Other than the images appearing in the public realm businesses have no way of tracking the image or other data back to the source of the leak.

A number of digital watermarking techniques are currently in use to identify the source of digital information such as stock photographs. It is relatively common to see a copyright notice superimposed on an image in order to prevent users from improperly using the image. Currently, most standard image watermarking technologies require that images be watermarked prior to their being requested. This is done generally with a visible watermark on the image (i.e. a semi-transparent over-lay of the company logo), or with a non-visible watermark, typically identifying the image as being the property of the company.

In most applications of digital watermarking, only one method of digital watermarking is employed, making the means to defeat the image watermarking technology much more feasible to achieve. By focusing only on a single method for digital watermarking, prior art processes are limited in providing long-term protection of the digital data.

SUMMARY

The invention, roughly described includes a method for digitally signing information in real-time, based on a user request for the information. The information can be in any number of digital data formats. By watermarking the data in a manner which associates the watermark with the request transaction, the data can be tracked back to the initial requester. In one embodiment, the method is useful in a Web server, and can be implemented using a server-side API filter.

One embodiment of the method includes a method implemented at least in part by a computing device. The method includes receiving a data request from a user and determining whether the data requested should be marked. If the data should be marked, the method includes marking the data with a signature identifying at least one component of the user request; and storing information identifying the user with the request and the at least one component.

In another embodiment, a watermarking method is implemented at least in part by a computing device and includes receiving a data request from a user and logging the data request with the user identity. Once the computing device retrieves the data, the method includes determining whether the data is an image. If the data is an image, the method includes marking the image with at least a first digital watermark identifying information about the user request. The method then returns the image with the digital watermark to the user. Additional watermarking methods may be used, and multiple methods used on one file.

Yet another embodiment includes a computer-readable medium having computer-executable components. A data distribution component responds to requests for data from a user, and a data marking component receives a request for data from a user and marks requested data with a digital signature created to identify the user request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 depicts a first digital signature and identification method.

FIG. 7 depicts a second digital signature and identification method.

FIG. 9 depicts a third digital signature and identification method.

DETAILED DESCRIPTION

A method for digitally signing or watermarking information in real-time, based on a specific user request for the information, is provided. The information can be in a digital format and can include any number of digital data types, including an executable file, a binary data file, a text file, an image data file or the like. By watermarking the information in a manner which associates the watermark with the request transaction, information can be tracked back to the initial requester. The method allows one to select from one or more watermarking schemes for the data, allowing both the scheme and the type to data to be watermarked to be configured by the corporate administrator.

In one embodiment, the method is useful in a Web server, and can be implemented using a server-side API filter that would allow for a variety of watermarking methods, as well as configurable watermarking data sets to be imbedded in the data, such as the authenticated requester's user-name. When implemented in a Web server, the method may be implemented using a plug-in architecture, providing developers with the ability to choose the type of data watermarked through a configuration process. The configuration may identify the data by type (image, executable), by source, by subject, by requesting username, by machine name, by user ID, or any number of discernable categories. The protection scheme may be implemented by watermarking the data returned in real-time, at the time of a user request for the data, and the watermark can be uniquely identified with the user, the request or both.

Figure 1:
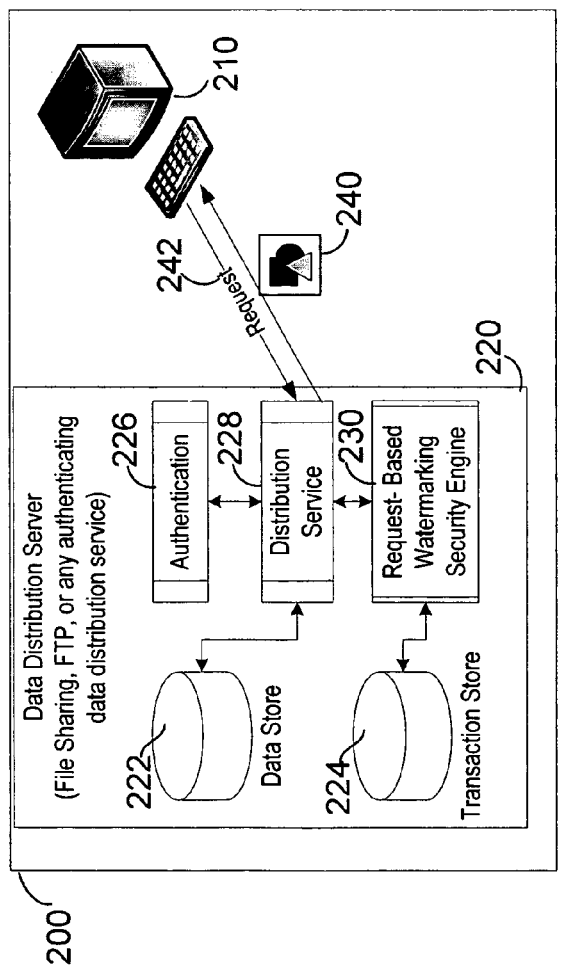
FIG. 1 depicts an exemplary computing environment suitable for implementing a request based watermarking method.
Figure 2:
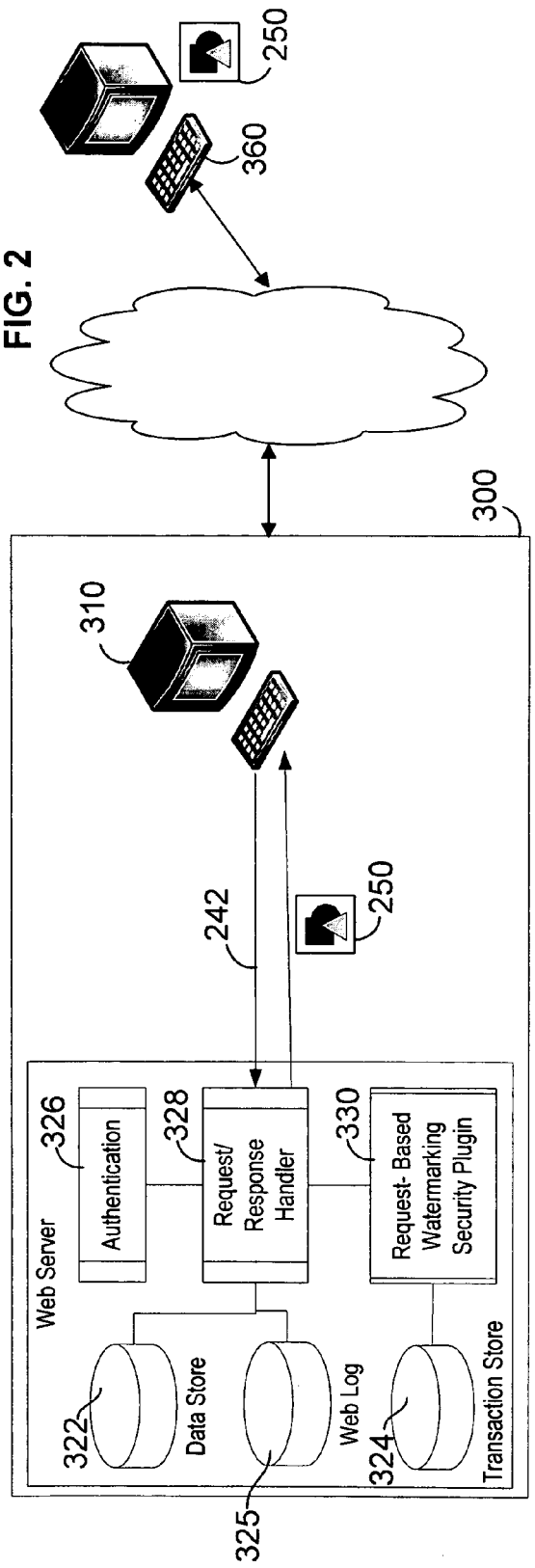
FIG. 2 is a block diagram illustrating a data distribution system implementing a request based watermarking method.

FIGS. 1 and 2 are block diagrams illustrating different systems in which the method of the invention may be utilized. FIG. 1 illustrates a data distribution server 220 provided in a secure environment 200. Secure environment 200 may be a secure network such as a corporate network where proprietary information is distributed to one or more users indicated at 210 upon requests made to a data distribution server. While only one user 210 is illustrated in FIG. 1, it will be understood that multiple users can connect to server 220. Moreover, it will be understood that the users may connect to server 220 over any number of secure means. A user 210 connects to the data distribution server via a generally secure network, or a public network using a secure means such as a Virtual Private Network (VPN), such as an IPSEC, or over a secure Web service such as secure HTTP (HTTPS).

The data distribution server may comprise, for example, a file sharing server (such as a Microsoft Windows 2003 server, Unix operating system server, or Linux operating system server, all including a file sharing service), an FTP server, a Web server or any authenticated data distribution service. In general, when a user 210 seeks information from the data distribution server, a request 242 will be generated by the user 210 and the information 240 returned to the user. A specific example of a Web server providing the data distribution function is shown with respect to FIG. 3.

The data distribution server 220 includes a data store 222 including proprietary information (or information which an administrator of the secure environment may wish to track), an authentication engine 226 which evaluates a request 242 from a user 210 for access to proprietary information, and a distribution service 228 providing the information in response to the request, all running on the data distribution server 220. Also shown on data distribution server 220 is a request based watermarking security engine 230. The security engine 230 acts in concert with the distribution service to determine whether information requested from, for example, the proprietary information store 222 should be subjected to a watermarking process. If so, the engine 230 generates and applies a watermark that allows the administrator of the secure environment to link the distributed data 240 back to the data request 242 from user 210.

FIG. 2 shows a specific example of a Web server system capable of implementing the watermarking process. As previously noted, many secure environments utilize internal Web servers 320 to disseminate information within the secure environment. The Web server 320 includes an information store 322 which may include proprietary information. Users 310 having access to information in the secure environment 300 send a request (usually in the form of a URL via Http, or https) to a request response handler 328 in the Web server 320 after authenticating with a Web server using an authentication engine 326. Authentication may be, for example, performed by requesting the user provide a username and password, or may be inherited from the user's authentication used to gain access to the secure environment 300.

The Web server 320 also includes a transaction log 325 wherein the request response handler keeps a log of all requests and responses made of the Web server 320. In this embodiment, the watermarking method may be implemented by a request based watermarking security plug-in 330. Most Web servers such as Microsoft's Internet Information Server, provide a plug-in architecture with well defined application programming interfaces (APIs) allowing programmers to develop Web based applications which are tightly integrated with the Web server. When a request for information 242, received at the request response handler 328, includes a request for proprietary information in the information store 322, the request based watermarking security plug-in will generate a request specific watermark for the data to be returned 250, and apply the mark prior to the data being returned to a user 310.

The watermarking security plug-in may also maintain a separate transaction store 324 which includes user and other request specific information. The information in the transaction store 325 may be used alone, or in concert with the information provided by the Web servers own Web log 325 to generate a request specific watermark for data 250. As a result, if the secure information is transmitted outside the secure environment 300 to another user 360, this information can be identified and associated with the request made by user 310.

Figure 3:
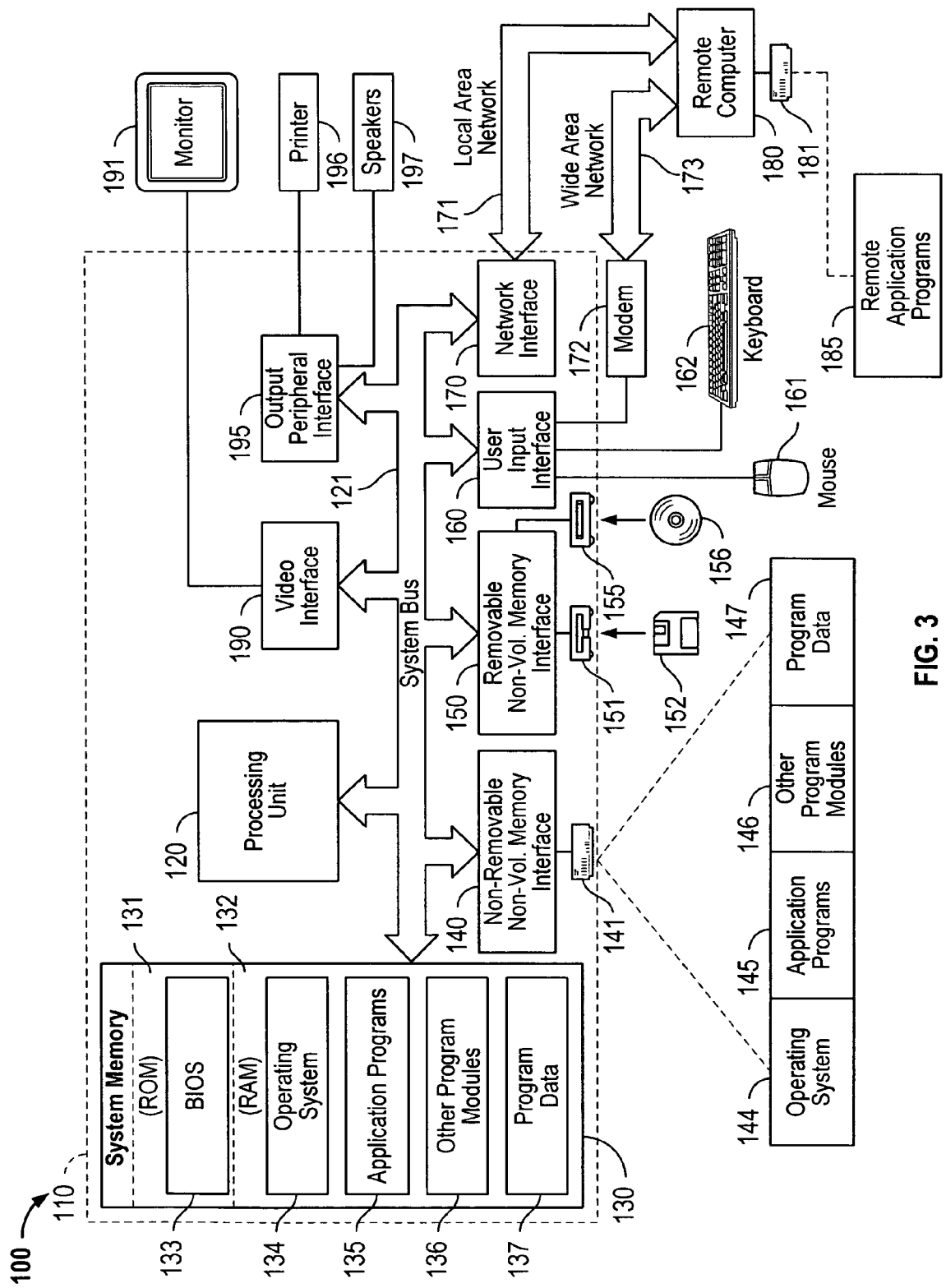
FIG. 3 is a block diagram illustrating a Web server implementing a request based watermarking method.

Either of the servers 200, 300 shown in FIGS. 1 and 2 may be implemented by a suitable computing system. FIG. 3 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Figure 4:
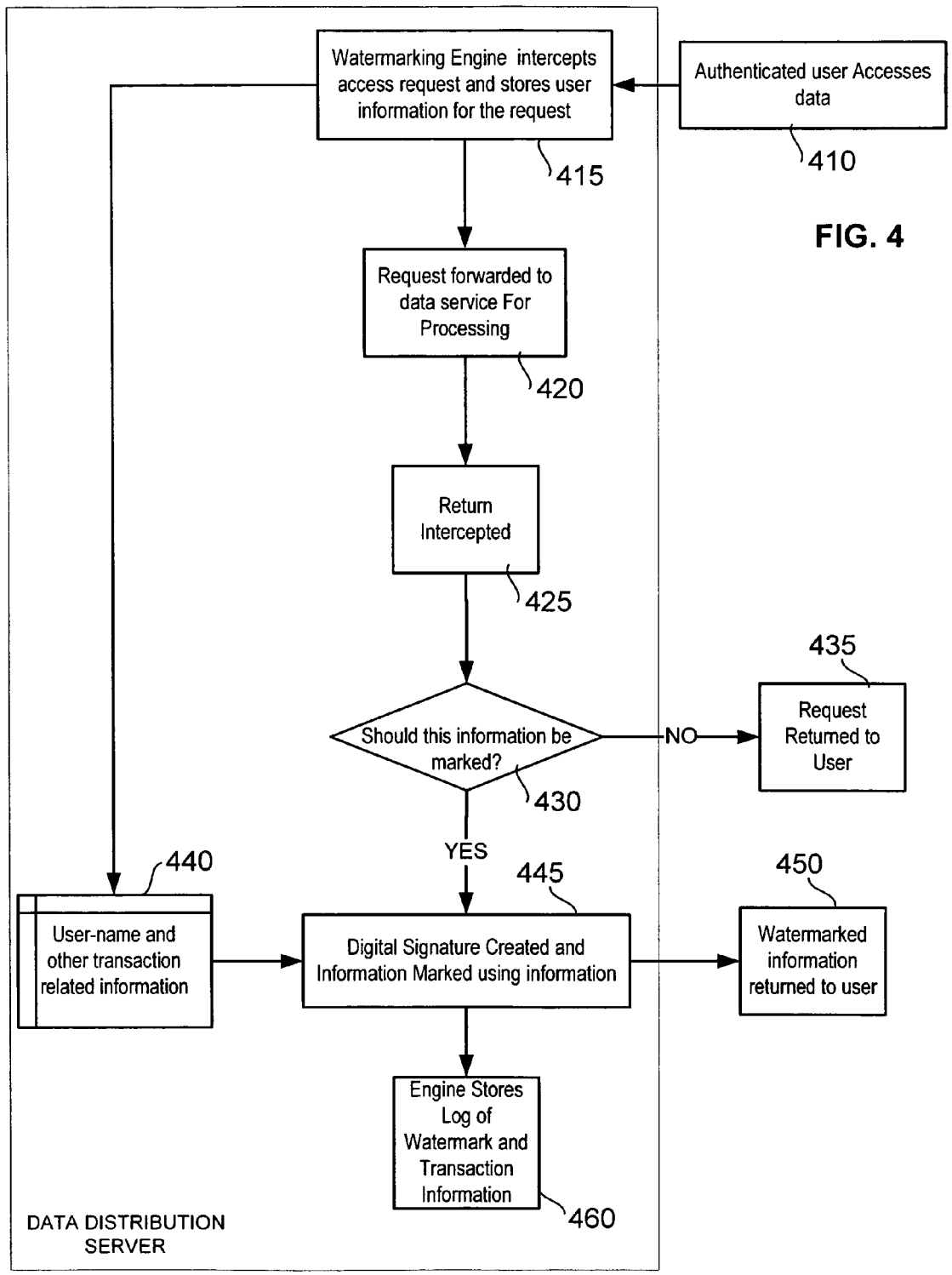
FIG. 4 is a flowchart illustrating a first embodiment of the watermarking method.

FIG. 4 illustrates a first embodiment of a request based watermarking process. In this embodiment, a request-based watermarking engine or watermarking security plug-in in a data distribution server or Web server intercepts an information request, determines whether the request is for proprietary information (or any information which should be marked) and marks the data based on the request.

At step 410, an authenticated user issues a request to access data from the distribution server's data store. In order to authenticate, as noted above, the user will provide a user name and other information, such as a password. Once the data distribution server receives an authenticated request, at step 415, the watermarking process intercepts the access request and stores the user information for the request in a record 440. This user information may include the user's log-in I.D., source IP, a machine ID, the type of request, the information requested, the manner of the request, (whether over a secure network or via a public network via secure mechanism), the time and date of the request (in a timestamp or other format), and other such information. Record 440 is held for use in creating a watermark on the information at a later point in time. Next, at step 420, the request is forwarded to the data service for processing. In the data distribution server, this would include handing the request off to the file sharing service or the FTP service. At step 420, the data distribution service will retrieve the information and attempt to return it to the user.

When the data distribution service returns the information, the return is intercepted at step 425 and a determination is made at step 430 as to whether or not the information is to be marked. In accordance with the method, the type and content of information which may be subject to being marked may be configured by an administrator of the secure environment 200, 300. For example, the administrator may determine that certain types of information such as any binary file, any source code file, any image, or the like, needs to include a watermark if distributed. The configuration may be specific to types of content (about particularly sensitive subject) or types of files (such as images), or even specific subdirectories or URLs in the data distribution server.

If the method determines at step 430 that the information is not information which needs to be marked, the requested information is returned to the user at 435. If the information should be marked at step 430, then at step 445, a digital watermark is created a using the information recorded at 440, and the data marked prior to being sent to the user at step 450. The watermarking engine stores a log of the watermarking transaction information for later use. This information can be used to identify a file 250 in possession of an unauthorized user 360 which has been transmitted to a user outside of the secure environment 300 at a later time.

Various methods of watermarking the information are contemplated for use with the method. The watermark may include information in the mark which specifically identifies the request, including the time, date and user making the request. Alternatively, the mark may include information sufficient to determine the user from information about the watermarking transaction stored at step 460. Variations on the type of methods which may be used are discussed with respect to FIGS. 6, 7 and 9. Various combinations of more than one watermarking technique may be used, as discussed below.

Figure 5:
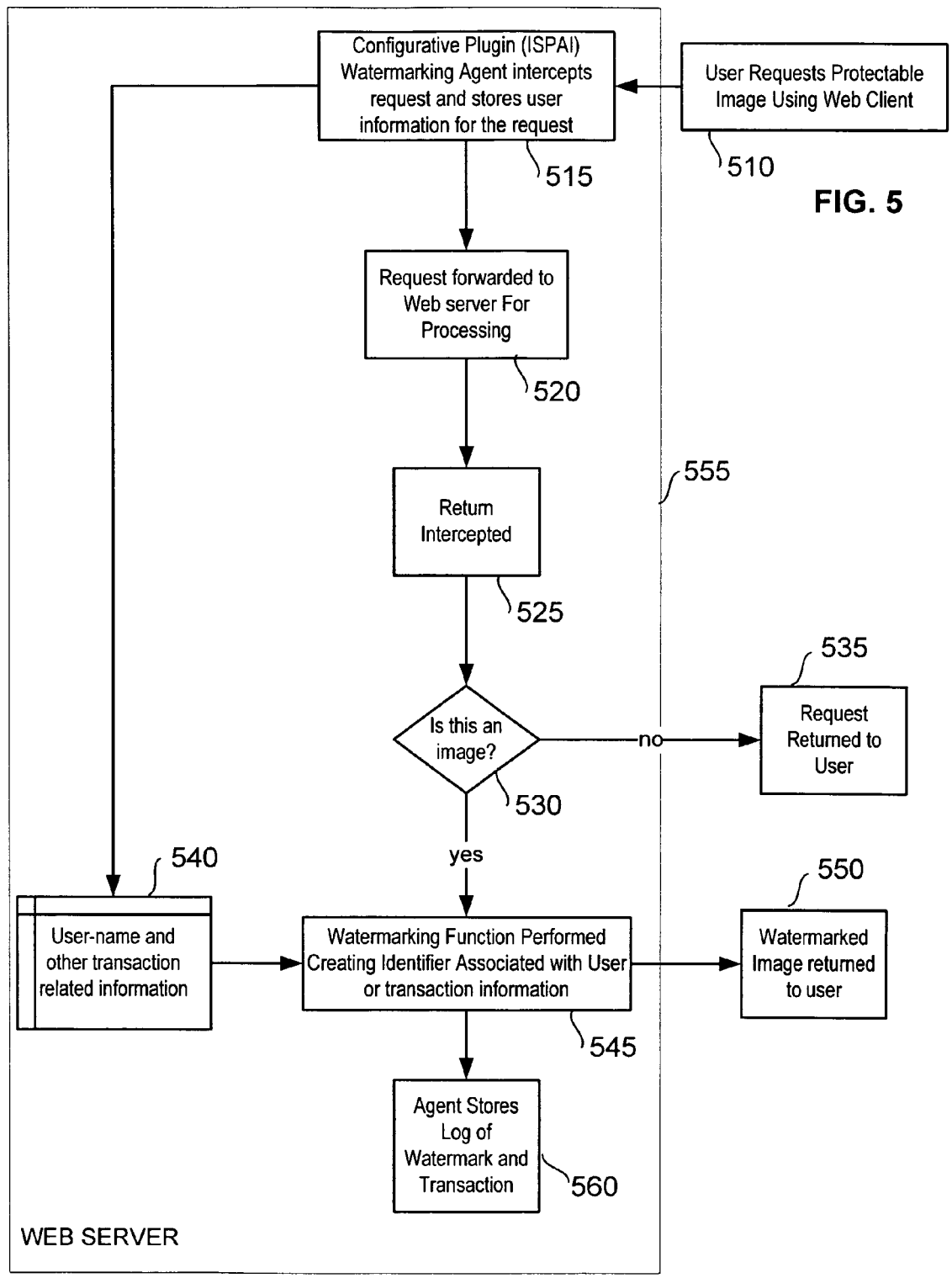
FIG. 5 is a flowchart illustrating a second embodiment of the watermarking method.

FIG. 5 illustrates an implementation of the watermarking method for a Web server such as that shown in FIG. 2. In FIG. 5, at step 510 the user request is for an image available on the Web server. At step 515, the watermarking plug-in intercepts the request and stores the information for the request record 540 for use by the watermarking function. At step 520, the request is forwarded to the Web server request handler for processing. When the image is returned at step 525 the return is intercepted. At step 530, the method determines whether or not the information being returned is an image and if not, the request is returned to the user at 535. If the information is in an image, then at step 545 a watermarking function is performed by creating an watermark associated with the user and/or transaction information. The image is marked, the watermarked image is then returned to the user at 550, and a log of the watermark transaction stored at step 560.

FIGS. 6 and 7 illustrate two methods for creating watermarks. There are a number of techniques and digital methods suitable for use with the present request based watermarking method. As is generally recognized, a watermark is a recognizable image or pattern of bits embedded into a file that is used to identify the source of illegal copies of a piece of data. Variations which may be considered include whether the digital watermark may be visible or hidden and whether it includes user information or a user identifier in the mark. In one embodiment, the identifier may be as simple as a visible date stamp or visible watermark indicating the name of the user. In another embodiment, the watermark may be a hidden unique sequence of bits visible only to the creator of the watermark. Visible marks change the impression of the data to the user. Stock photography agencies often add a watermark in the shape of a copyright symbol to previews of their images. Invisible watermarks do not change the perceptible image or data to the user. There are various spatial and frequency imaging techniques for adding watermarks to and removing them from digital data. Various combinations of watermarking techniques may be applied to the same information.

FIG. 6 shows a first technique for marking or digitally signing information requested by a user in accordance with steps 445 and 545. At step 610, the username and the time of the request are retrieved from records 440 or 540. At step 620, a unique identifier for the request is created. This unique identifier may be a hash of one or more elements of data recorded in table 540 or 440, or some other unique sequence of bits specifically identifying the information. In this embodiment, no user information is detectable from the watermark itself. At step 640, the unique identifier and associated user information is stored in a record retained within the secure environment. This stored information is then used in identifying a piece of data which has been retrieved from the secure environment 220, 230 and found outside of the secure environment. At step 630, the unique identifier is applied to the digital information. In one embodiment, it is stored in a manner which is not perceptible to an outside user. At a later point in time as indicated by the dash line between steps 640 and 650, at step 650 the disseminated information may be compared with the stored information to determine which user originally requested the information and provide a mechanism for determining where a security breach or other improper dissemination of information has occurred.

FIG. 7 illustrates an alternative method for creating a watermark. At step 710, the username and time of the transaction request are retrieved and a watermark including user specific information is generated. At step 720, a watermark is created in which user identification information can be detected in the watermark. The mark may include other information including g the specific time of the request and potentially other information stored by the request-based watermarking routine. In one embodiment, the user information is encrypted in the watermark and the system administrator retains a mechanism of decrypting the user information. This watermark is applied to the information at step 720. At a later point in time, as indicated between the dash in lines between 720 and 730, the information in the mark is used to determine the origin of the data.

In FIG. 7, the watermarking step places an identifier of the user in the actual watermark. In some cases this may not be desirable as companies may not wish to expose their user information in a manner which may be determined by an outside source. The advantage of the method of FIG. 6 is that all information concerning the image is maintained within the secure environment.

Figure 8:
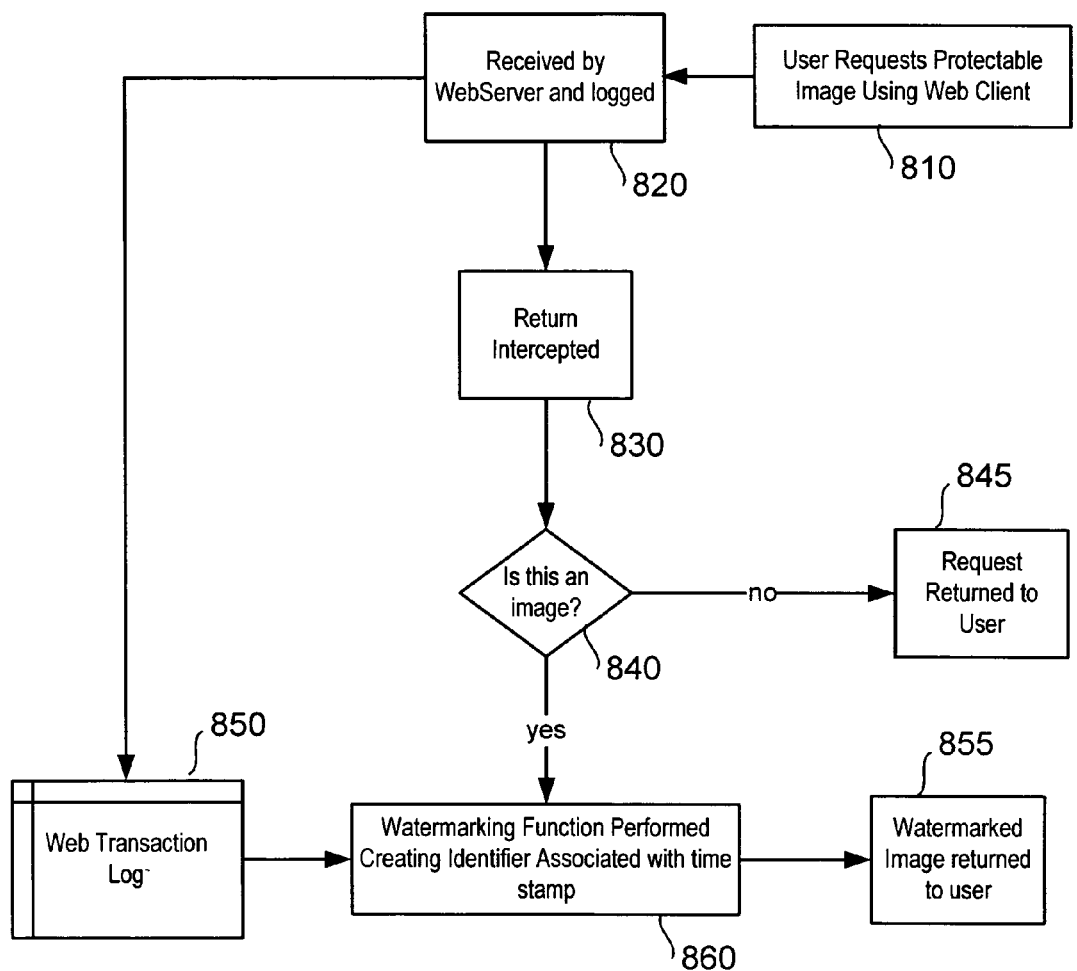
FIG. 8 is a flowchart illustrating a third embodiment of the watermarking method.

FIG. 8 illustrates still another embodiment of the request based watermarking method. In this case, information from the Web server Web logs is used to detect the origin of the data. At step 810, a user requests information such image from a Web server using a Web client. Instead of being initially received by the agent, the request is received in a normal manner by the Web server and the transaction logged at step 820. When the information is returned at step 830, it is intercepted by the watermarking method and a determination made at step 840 of whether or not the information is an image or other piece of data to be marked. If the data is not to be protected it is returned to the user at step 845. If the image is to be protected, then at step 860 the watermarking function is performed by creating an identifier associated with, for example, the time stamp of the request. No user identifiable information is included in the mark. The mark may be visible or invisible to the end user. This information is placed in a visible or invisible manner on the data and the data returned to the user at 855. In this case, no log of the watermarking transaction is made.

FIG. 9 shows how the process of FIG. 8 may be utilized to identify watermarked information based on the request. In FIG. 9, at step 910, the username and time of the request is retrieved. Additional information, such as the source address of the request may also be retrieved. At step 920, the unique information is used to generate a unique watermark, and the watermark is applied in a user-discernable or non-discernable manner. In this case, the unique watermark includes information tied to the Web-log information. For example, the time and date of the request may be included in the watermark. Additionally, an internal source identifier (such as a private IP address) may be included in the watermark. The mark is then applied to the data in a visible or invisible fashion, and the Web-log information is retained at step 930. At a later point in time, at step 940, the watermark data from the image and the Web servers request logs can be compared to determine which user requested the initial information.

Additional configuration options include allowing different types of watermarks to be generated using different techniques at each of steps 860, 545 and 445. That is, for each type of request, or each different request, or different types of data, a different digital signature technique may be utilized. Alternatively, the digital technique marking different pieces of data may be randomized, or provided by for particular category. For example, images may be marked using one technique, while executable binaries are marked is using a different technique. In addition, multiple techniques of watermarking including visible and invisible watermarks can be utilized on a single piece of material.

A key advantage to the technique is that it can be implemented in Web servers used in internal intranets via the plug-in architecture standard in all Web server systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method implemented at least in part by a computing device, the computing device including a file server having a plug-in architecture, the method implemented by a plug-in and comprising:
receiving a request for data from a user;
logging the request with a user identity;
retrieving the data requested;
determining whether the data requested is an image and if the data requested is an image, determining how the data requested should be marked based on a configuration defined by an administrator of the data, wherein determining how the data requested should be marked includes selecting one or more marking techniques by the plug-in to mark the data requested based on the configuration defined by the administrator of the data, the configuration including two or more of: a data type, a data source, the user or a requesting source;
marking the data requested with a signature identifying at least one component of the user request, wherein marking the data requested with the signature includes generating a random unique identifier for the user from said at least one component;
storing information identifying the user associated with the request and the at least one component; and
returning the data requested with the signature to the user, wherein the data returned to the user includes the information identifying the user in the signature.

2. The method of claim 1 wherein the data request is one of a file sharing request, an FTP command, or an HTTP command.

3. The method of claim 1 wherein the signature includes at least two digital watermarks.

4. The method of claim 1 wherein said at least one component of the user request includes one of a user identifier, a request timestamp, or a request type.

5. The method of claim 1 wherein the at least one component includes user identification information, and the user identification information is included in the signature.

6. The method of claim 1 wherein the step of marking includes applying a visible watermark.

7. The method of claim 1 wherein the step of marking includes applying a watermark not discernable to the user.

8. The method of claim 1 wherein the step of storing includes storing the unique identifier with a username identifying the user.

9. The method of claim 1 wherein the step of determining is based on one or more of the data type, the data source, the user or the requesting source.

10. A method implemented at least in part by a computing device, the computing device including a file server having a plug-in architecture, the method implemented by a plug-in and comprising:
receiving a data request from a user;
logging the data request with the user identity;
retrieving the requested data;
determining whether the data is an image and if the data is an image, determining how the image should be marked based on a configuration defined by an administrator of the data, wherein determining how the image should be marked includes selecting one or more marking techniques by the plug-in to mark the image requested based on the configuration defined by the administrator of the data, the configuration including two or more of: a data type, a data source, the user or a requesting source;
generating at least a first digital watermark identifying information associated with the user request, wherein the at least first digital watermark is based on hashing of one or more of a user identifier, a request timestamp, or a request type;
marking the image with the at least first digital watermark; and
returning the image with the at least first digital watermark to the user, wherein the image returned to the user includes information identifying the user in the at least first digital watermark.

11. The method of claim 10 wherein the step of marking includes generating a unique identifier from the user identity and the data request.

12. The method of claim 10 wherein the step of marking includes applying at least a second digital watermark to the image.

13. The method of claim 12 wherein the first digital watermark and the second digital watermark are applied using different watermarking techniques.

14. The method of claim 10 wherein the step of marking includes generating a random unique identifier for the user and at least one component of the data request, and the method further includes the step of storing the unique identifier with a username identifying the user.

15. A computer-readable storage device having computer-executable components comprising:
 (a) a data distribution component responding to requests for data from a user; and
 (b) a data marking component implemented as a plug-in to the data distribution component, receiving a request for data from a user, the data marking component including instructions for a processing device to perform a method including:
 reading at least one data request from a user;
 logging the data request with the user identity;
 retrieving the data;
 determining whether the data is an image and if the data is an image, determining how the image should be marked based on a configuration defined by an administrator of the data, wherein determining how the image should be marked includes selecting one or more marking techniques by the data marking component to mark the image requested based on the configuration defined by the administrator of the data, the configuration including two or more of: a data type, a data source, the user or a requesting source;
 generating at least a first digital watermark identifying information associated with the user request, wherein the at least first digital watermark is based on hashing of one or more of a user identifier, a request timestamp, or a request type;
 marking the image with the at least first digital watermark; and
 returning the image with the at least first digital watermark to the user, wherein the image returned to the user includes information identifying the user in the at least first digital watermark.

16. The computer readable storage medium of claim 15 wherein the marking component includes at least a first watermarking function generating the at least first digital watermark identifying information about the user request and at least a second watermarking function generating a second digital watermark using a different watermarking technique.

17. The computer readable storage medium of claim 15 wherein the marking component includes an identification logging component storing information associating the at least first digital watermark and at least the second digital watermark with the user request for data.

* * * * *